Aug. 4, 1964　　　　　J. WILLSEA　　　　　3,143,362
DICYCLE

Filed Dec. 7, 1962　　　　　　　　　　2 Sheets-Sheet 1

INVENTOR.
JASPER WILLSEA
BY
HIS ATTORNEYS

Aug. 4, 1964  J. WILLSEA  3,143,362
DICYCLE
Filed Dec. 7, 1962  2 Sheets-Sheet 2
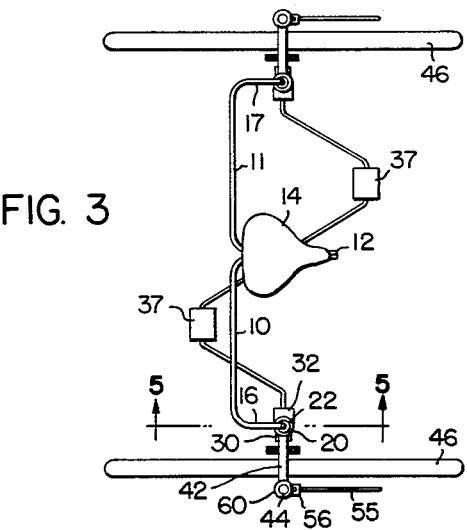
FIG. 3
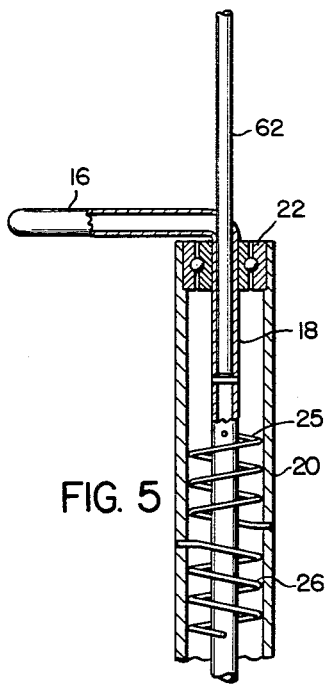
FIG. 5
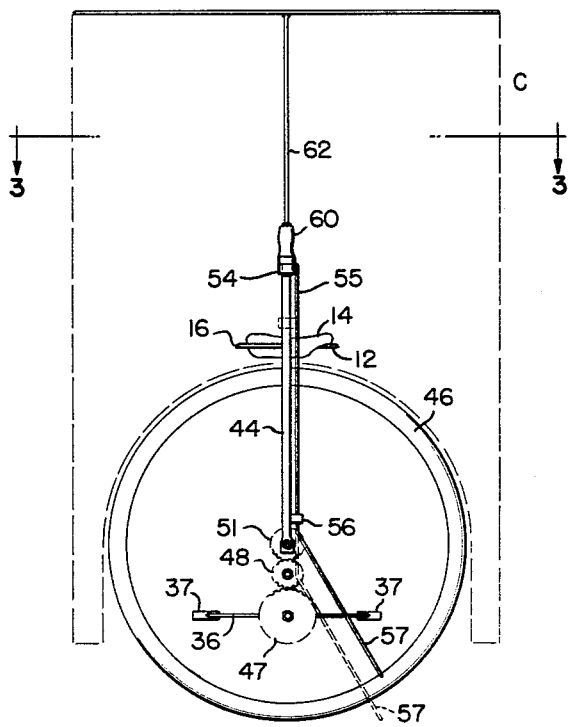
FIG. 2
FIG. 4
INVENTOR.
JASPER WILLSEA
BY
HIS ATTORNEYS

United States Patent Office 3,143,362
Patented Aug. 4, 1964

3,143,362
DICYCLE
Jasper Willsea, 430 Lake Road, Webster, N.Y.
Filed Dec. 7, 1962, Ser. No. 243,109
5 Claims. (Cl. 280—208)

This invention relates to a dicycle. More particularly, the present invention relates to a new rider-propelled vehicle.

The most popular rider-propelled vehicle is the bicycle. The ordinary modern bicycle supports the rider in the manner and in the mode of a horseback rider, and early models of the bicycle placed riders at horseback level. This is actually an unnatural position and height for balance and for riding comfort, and probably was derived primarily from a desire to simulate the means of transportation that was most popular during the period when the early development of the bicycle occurred, which was horseback riding. It is this unnatural position that creates difficulty for the person who is learning to ride a bicycle.

One object of the present invention is to provide a new and improved rider-propelled vehicle that permits riding in a more natural and in a more comfortable position than the bicycle.

A more specific object of the invention is to provide a rider-propelled vehicle that can be operated by a rider from a position and posture that is more nearly in accordance with the rider's natural mode and manner.

Another object of the invention is to provide a rider-propelled vehicle in which the rider is mounted in a natural position for the rider and in such a manner that the center of gravity of the loaded vehicle and, as well, the cranking and the centers of the propulsive and directive forces, are at the lowest feasible levels in respect to the wheel axles.

Another object of the invention is to provide a vehicle of the character described in which the directive forces that are employed to steer the vehicle are not confused by the necessity for maintaining a sidewise equilibrium as is the case with the bicycle.

Still another object of the invention is to provide a rider-propelled vehicle that is easy to learn to ride. A related object of the invention is to provide a vehicle of the character described in which the means for steering and the means for balancing the vehicle are not confused with each other.

A further object of the invention is to provide a vehicle of the character described that can have all of the desirable characteristics of the modern bicycle as to continuous propulsion, continuous direction, coasting and braking.

Yet another object of the invention is to provide a rider-propelled vehicle that has a compact and convenient design that is constructed to suit the natural mode of the rider and that can conveniently be handled, shipped, stored, parked and enclosed for rider comfort.

Another object of the invention is to provide a vehicle of the character described that is simple and economical to manufacture and that has a design that is effective and efficient both in construction and in use.

Other objects of the invention will be apparent hereinafter from the specification from the recital of the appended claims. To these and other ends, the invention resides in certain improvements and combinations of parts, all as will hereinafter be more fully described, the novel features being pointed out in the claims at the end of this specification.

FIG. 2 is a side elevation thereof, on a reduced scale, showing by a dotted line the position to which a stand can be moved to park the vehicle;

FIG. 3 is a section taken on the line 3—3 of FIG. 2, looking in the direction of the arrows;

FIG. 4 is a fragmentary part section, part elevation, on an enlarged scale, of a detail of the structure of the vehicle at a hand grip, and FIG. 5 is a fragmentary sectional view, partly in elevation, on an enlarged scale, taken on the line 5—5 of FIG. 3, looking in the direction of the arrows.

Figure 1:
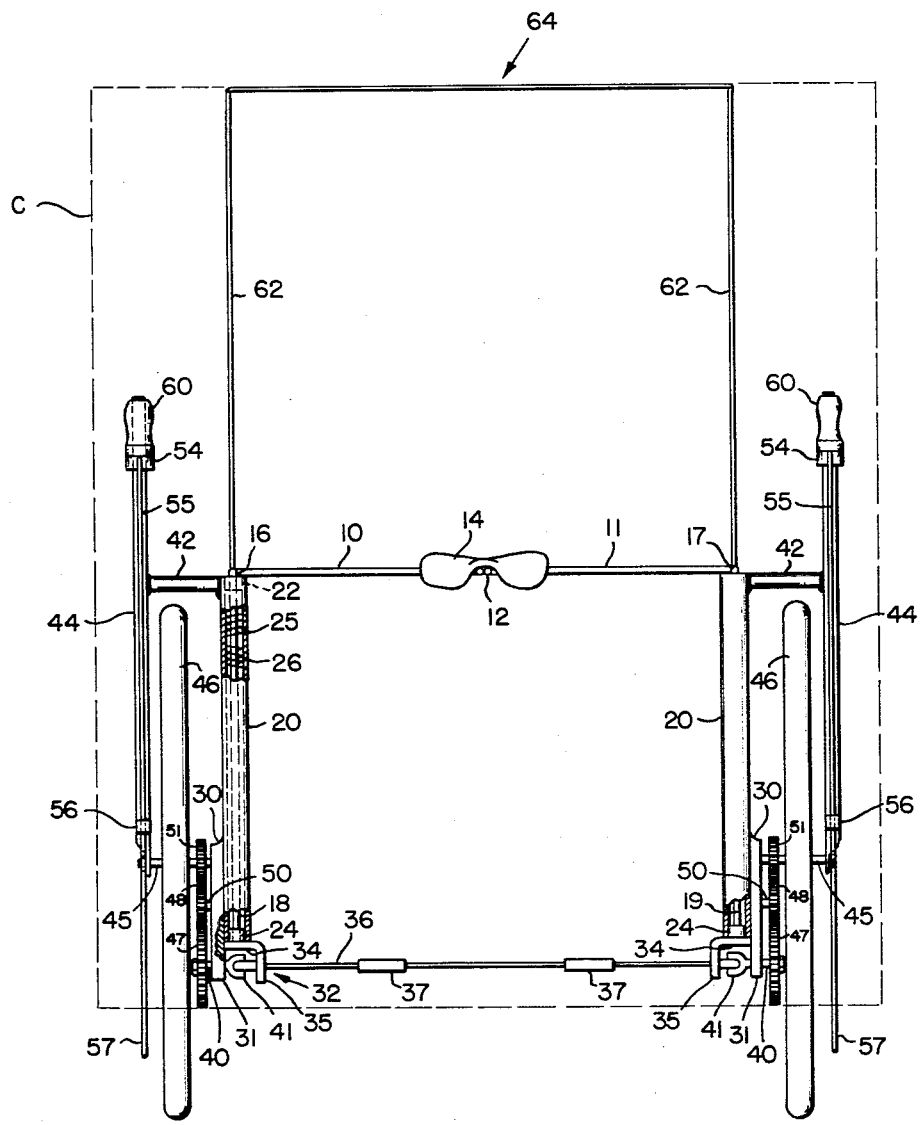
FIG. 1 is a front elevation, partly broken away, of a vehicle that is constructed in accordance with one embodiment of the present invention, the dashed line indicating the outline of a cover that may be placed over the vehicle to shelter the rider from the weather.

Referring now in detail to the drawings by numerals of reference, the numerals 10, 11 denote horizontally extending tubular bars that form part of the frame of the vehicle and that are generally U-shaped, as can be seen in FIG. 3. These bars have inner arms that are united to provide a forwardly projecting saddle support 12 upon which a saddle 14 is mounted. The bars 10, 11 also have forwardly projecting outer arms 16, 17, respectively, that have downwardly depending tubular extensions 18, 19, respectively.

The structure of the dicycle is generally symmetrical about a vertical plane passed through the saddle 14, and in describing the remainder of the structure, in general, like numerals are employed to refer to like parts that are located at opposite sides of the dicycle.

A sleeve 20 is mounted about the downwardly extending tube 18, and a pair of bearings 22, 24 are interposed between the inner wall of the tube 18, at its upper and lower ends respectively, and the sleeve 20, to permit rotation of the sleeve 20 about the tube 18. A pair of counter-working springs 25, 26, are interposed between the tube 18 and the sleeve 20, constantly to urge the sleeve 20 to a normal position relative to the tube 18, the normal position being that illustrated in the drawings.

The sleeve 20 is formed at its lower end with a boss 30 that has a downward extension 31 that projects below the lower end of the sleeve. A right angle bracket 32 is mounted with one of its arms 34 disposed across the lower end of the sleeve 20 and secured to the lower end of the tube 18, for rotation upon rotation of the tube; and the other of its arms 35 is disposed to project downwardly, remote from the extension 31 of the boss 30. The boss extension 31 and the bracket arm 35 are formed with transverse holes that are aligned in the normal position of the sleeve 20.

One end of a crankshaft 36, on which a pair of pedals 37 are mounted, is extended through the opening in the bracket arm 35. A drive shaft 40 is extended through the opening in the boss extension 31. The drive shaft 40 is connected to the end of the crankshaft 36 by a universal joint 41, that is disposed between the boss extension 31 and the bracket arm 35.

A horizontal bar 42 is welded to the upper end of the sleeve 20 and projects outwardly from the sleeve. An upright arm 44 is welded, intermediate its ends, to the outer end of the bar 42. The arm 44 is formed at its lower end with an opening to receive one end of an axle 45. The other end of the axle 45 is journalled in the boss 30. A wheel 46 is mounted on the axle 45. A gear 47, that is mounted on the outboard end of the drive shaft 40, is engaged with a pinion 48 that is mounted on a stub shaft 50 that is journalled in the boss 30. The pinion 48 in turn is mounted to drive a gear 51 that is secured on the axle 45 intermediate the wheel 46 and the boss 30.

A collar 54 (FIGS. 1, 4) is mounted for sliding movement on the arm 44 adjacent the upper end of the arm. A rod 55 is secured to one side of the collar 54 to depend downwardly along the arm 44. A guide 56 is secured to the arm 44 at its lower end. This guide is formed with an eye through which the rod 55 is passed, for sliding movement therein. The rod 55 is formed at its lower end with an offset, downward extension 57. As shown in FIG. 4, a spring plunger 58, that comprises a conventional spring-pressed ball that is mounted in the bore of an externally threaded sleeve, is mounted within the collar 54, detachably to engage in holes or detents in the arm 44, to permit the rod 55 to be moved down or up upon the application of sufficient force to the collar 54, to selected elevations as shown, for example, in dotted lines in FIG. 2. A handle grip 60 is mounted on the upper end of the arm 44 for the convenience and comfort of the rider in grasping the upper end of this arm, and the handle grip and upper end of the arm form a steering extension.

One arm 62 of a frame 64 is detachably engaged in the bore in the tube 18, for supporting a foul weather canopy or sun screen C when needed.

The structure is such that the vehicle of this invention comprises a frame that extends generally transversely of the direction of vehicle movement, and a pair of forks that are mounted at opposite sides of the frame respectively, for independent pivotal movement about upright axes. Each of these forks comprises a horizontal cross bar 42 and a pair of arms that depend downwardly from the opposite ends of the bar 42. One of these arms comprises the tube 20, and the other, the upright arm 44. A wheel is mounted for rotation in each fork.

In use of the paracycle, the rod 55 is dropped down on the arm 44 to the dotted line position shown in FIG. 2, so that the dicycle can be permitted to stand at rest, parked, without the need of any other support. The rider then mounts the saddle 14 in a natural, comfortable posture. The rod 55 is then drawn up until the collar 54 is immediately beneath the handle grip 60, where the spring plunger 58 will hold it. The pedals 37 are then operated to drive the crank shaft 36. The forces that are applied to the pedals 37 are transmitted through the crankshaft 36 and the universal joints 41 to the drive shafts 40, through the gear trains to the wheels.

Once the dicycle is in motion, the rider can balance easily since his weight, and the weight of the vehicle, are concentrated in a direct line above the wheel axles 45, and above the axis of rotation of the crankshaft 36.

To turn the dicycle in one direction or the other, the rider moves one or both of the arms 44, to cause pivotal movement of either one or both of these arms and their interconnected sleeves 20 about their respective tubes 18, 19. When an arm 44 is moved so as to cause it to pivot, the springs 25, 26 coact to oppose the movement. The effect of the two sets of coacting springs, one set at each side of the vehicle, provides the rider with a proprioceptive awareness as to the extent of the movement of a wheel or wheels from the normal position.

A vehicle that is constructed in accordance with the present invention is easy and comfortable to ride, and is used by its rider in a natural position. A light weight enclosure, canopy, or cover can be mounted on the frame 64 whenever desired, and can be removed easily, together with the frame 64, when it is not needed.

While the construction of a vehicle in accordance with the present invention is such that a sense of balance is obtained with a minimum of effort, and proper balance is easily maintained because of the construction of the vehicle and the distribution of weights and moments, one or more training or permanent wheels may be attached to the vehicle, if desired, either in back of the rider, in front of the rider, or in both locations, particularly to permit the rider to become familiar with the vehicle. Moreover, a plurality of such vehicles can readily be interconnected, to provide a multipassenger vehicle. For example, two dicycles can be quickly and simply coupled together by inserting the ends of a pair of U-shaped connecting rods, fore and aft, in the bores of the tubes of the two dicycles. Columnar, row, and mixed columnar and row arrangements of a plurality of coupled dicycles can easily be made, for group riding or for mass displays in parades and the like.

While the invention has been disclosed herein by reference to the details of a preferred embodiment thereof, it is to be understood that such disclosure is intended in an illustrative, rather than in a limiting sense, and it is contemplated that various modifications in construction and arrangement of the parts will readily occur to those skilled in the art, within the spirit of the invention and the scope of the appended claims.

I claim:

1. A rider-propellable vehicle comprising a frame that extends transversely of the direction of vehicle movement, a pair of forks mounted at the opposite sides of said frame respectively for independent pivotal movement about generally upright axes, a wheel mounted between the furcations of each of said forks respectively for rotation about a generally horizontal axis, pedal means mounted on said frame and operatively coupled to said wheels through universal joints for rotating the wheels, and a steering extension connected to each of said forks respectively for adjusting the position of each of said forks and wheels about its respective upright pivotal axis.

2. A rider-propellable vehicle comprising a frame that extends transversely of the direction of vehicle movement, a pair of forks mounted at the opposite sides of said frame respectively for independent pivotal movement about upright axes, a shaft mounted between the furcations of each of said forks, a wheel mounted on each of said shafts for rotation upon rotation of the shaft and for movement upon movement of its respective fork, a pair of pedals mounted on a crankshaft that is journalled in said frame and that is operatively coupled through universal joints to said shafts to drive said shafts and said wheels upon operation of said pedals, first steering means coupled to one of said forks for adjusting the position of that respective fork and its associated wheel about the respective upright axis of the fork, second steering means coupled with the other of said forks for adjusting the position of that respective fork and its associated wheel about the respective upright axis of that fork, and opposed, counter-working spring means interposed between each of said steering means and the frame, constantly to urge each of said steering means to a normal position and to oppose any adjustment in the positions of the forks and their respective associated wheels from their respective normal position.

3. A vehicle in accordance with claim 2 including a rider-supporting seat mounted on said frame and disposed to place the center of gravity of the rider substantially directly over the line connecting the axes of rotation of the wheels.

4. A rider-propellable vehicle comprising a transverse frame, a drive shaft journalled at its opposite ends at opposite sides of said frame respectively, rider-operable means for rotating said drive shaft, a pair of forks mounted at the opposite sides of said frame respectively for pivotal movement about upright axes relative to said frame and independently of each other, a pair of wheels mounted between the furcations of said forks respectively for rotation about generally horizontal axes and for movement upon movement of the respective forks, means including a universal joint and a gear train operatively coupling each of the ends of said drive shaft to each of said wheels respectively, steering extensions connected to each of said forks respectively for adjusting the position of each of said forks and wheels about its respective upright pivotal axis, and a seat for a rider mounted on the frame to support the rider substantially directly over the line connecting the axes of rotation of the wheels.

5. A vehicle in accordance with claim 4 including counter-working spring means interposed between each of said steering extensions and the frame, constantly to urge each of said steering means to a normal position and to oppose any adjustment in the positions of the forks and their respective associated wheels from their respective normal positions.

References Cited in the file of this patent

UNITED STATES PATENTS

| | | |
|---|---|---|
| 87,579 | McKerahan | Mar. 9, 1869 |
| 89,069 | Parry | Apr. 20, 1869 |
| 442,240 | Schulze | Dec. 9, 1890 |
| 606,525 | Dunning et al. | June 28, 1898 |
| 727,405 | Modisett | May 5, 1903 |
| 2,812,194 | Ajero | Nov. 5, 1957 |

FOREIGN PATENTS

| | | |
|---|---|---|
| 1,075,464 | France | Apr. 14, 1954 |